United States Patent [19]

Barmatz et al.

[11] Patent Number: 4,523,682
[45] Date of Patent: Jun. 18, 1985

[54] ACOUSTIC PARTICLE SEPARATION

[75] Inventors: Martin B. Barmatz, Glendale; James D. Stoneburner; Nathan Jacobi, both of Pasadena; Taylor G. Wang, Glendale, all of Calif.

[73] Assignee: The United States of America as represented by the Administrator of the National Aeronautics and Space Administration, Washington, D.C.

[21] Appl. No.: 379,601

[22] Filed: May 19, 1982

[51] Int. Cl.³ .................................................. B07C 5/00
[52] U.S. Cl. .................................... 209/638; 209/422; 181/0.5
[58] Field of Search .............. 209/629, 631, 638, 345, 209/590, 638, 134, 147, 422; 73/32 R, 587, 589, 645, 505; 181/139, 196, 197, 198, 206, 231, 0.5; 55/D15

[56] References Cited

U.S. PATENT DOCUMENTS

| | | | |
|---|---|---|---|
| 2,071,260 | 2/1937 | Holden | 209/179 |
| 2,766,881 | 10/1956 | Westervelt et al. | 209/138 |
| 3,380,584 | 4/1968 | Fulwyler | 209/638 X |
| 4,055,491 | 10/1977 | Porath-Furedi | 210/19 |
| 4,076,617 | 2/1978 | Bybel et al. | 210/19 |
| 4,280,823 | 7/1981 | Szonntagh | 55/15 |
| 4,393,708 | 7/1983 | Barmatz et al. | 73/505 |

FOREIGN PATENT DOCUMENTS 603245 8/1978 Switzerland ................ 209/638

Primary Examiner—David A. Scherbel
Assistant Examiner—Glenn B. Foster
Attorney, Agent, or Firm—Paul F. McCaul; John R. Manning; Thomas H. Jones

[57] ABSTRACT

A method is described which uses acoustic energy to separate particles of different sizes, densities, or the like. The method includes applying acoustic energy resonant to a chamber (14) containing a liquid or gaseous medium to set up a standing wave pattern that includes a force potential well wherein particles within the well are urged towards the center, or position of minimum force potential. A group of particles to be separated is placed in the chamber, while a non-acoustic force such as gravity is applied, so that the particles (50–52 in FIG.2) separate with the larger or denser particles moving away from the center of the well to a position near its edge and progressively smaller lighter particles moving progressively closer to the center of the well. Particles are removed from different positions within the well, so that particles are separated according to the positions they occupy in the well.

5 Claims, 10 Drawing Figures

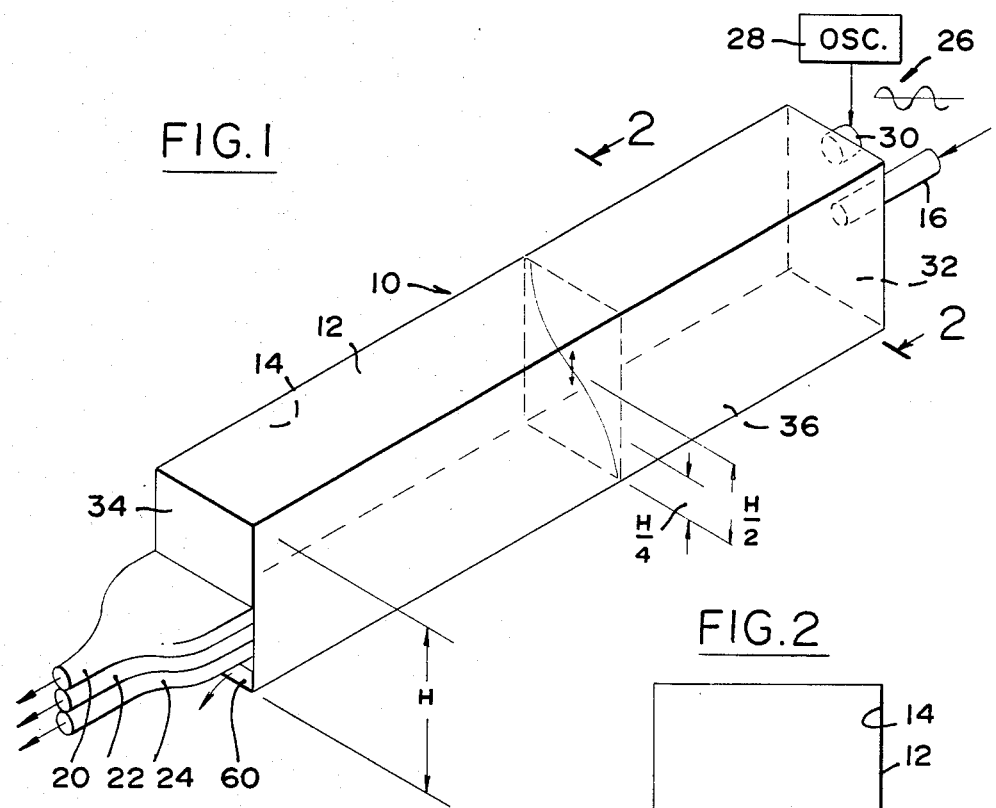
FIG.1
FIG.2
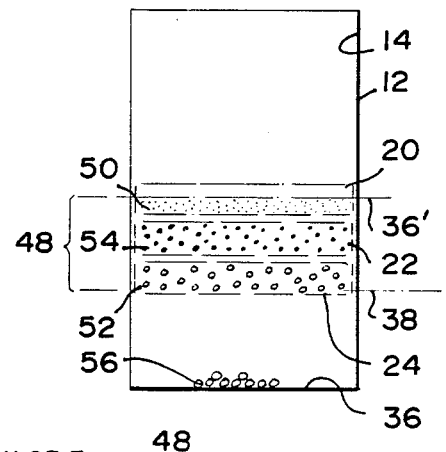
FIG.4
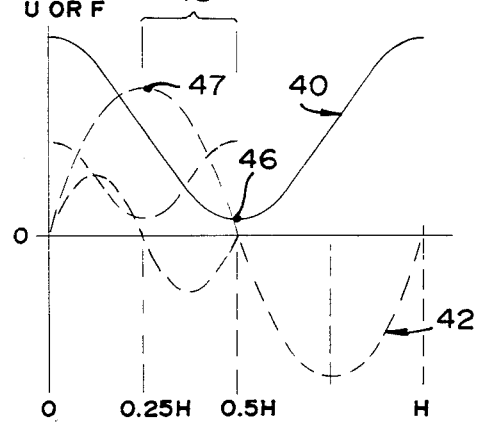
FIG.3

ACOUSTIC PARTICLE SEPARATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

There are many applications where it is desirable to separate particles, or small objects, according to some selected physical property, especially in outer space applications. For example, particles of the same material and the same average dimensions (as determined by screen sizing) may be of different shapes, as where some are relatively smooth and spherical while others are rough and non-spherical. In another example, particles of the same size may be formed of materials of different densities. In other examples, particles may have different electrostatic charge or magnetic attraction which may not be proportional to their mass or surface area. Applications exist in fusion target separation, biological particle separation, and manufacturing processes, which can benefit from the ability to separate particles of different selected properties. An effective technique for separating particles of different properties, especially in separating particles of only slightly different properties, would be of considerable value.

SUMMARY OF THE INVENTION

In accordance with one embodiment of the present invention, a method and apparatus are provided for separating out particles of selected properties from larger groups of particles, which is effective in separating particles of only slightly different properties. The method includes applying sinusoidal acoustic energy to a chamber, of a wavelength that is resonant to a chamber mode, to establish an acoustic standing wave pattern. The standing wave pattern includes a force potential well with a center, or minimum force potential, to which particles are urged, for particles initially lying anywhere from the center to the edge of the well. At the same time, a non-acoustic force field (gravity, electrostatic, or magnetic) is applied to the chamber to urge particles away from the center of the well and towards or beyond an edge of the well. A plurality of particles are positioned within the force potential well, and each particle moves to a position at which the opposing forces (the acoustic force and the second non-acoustic force) are equal. Particles are separately removed as from different positions within the well, to separate the particles according to the positions they assumed in the well.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perpsective view of an acoustic particle separator constructed in accordance with one embodiment of the present invention;

FIG. 2 is a view taken on the line 2—2 of FIG. 1.

FIG. 3 is a graph showing variations of force potential with height and of force with height, in the chamber of FIG. 2.

FIG. 4 is a sectional view of the chamber of FIG. 2, showing the wavelengths and the positions of the centers of force potential wells in the chamber of FIG. 2.

DESCRIPTION OF THE PREFERRED EMBODIMENTS

Figure 5:
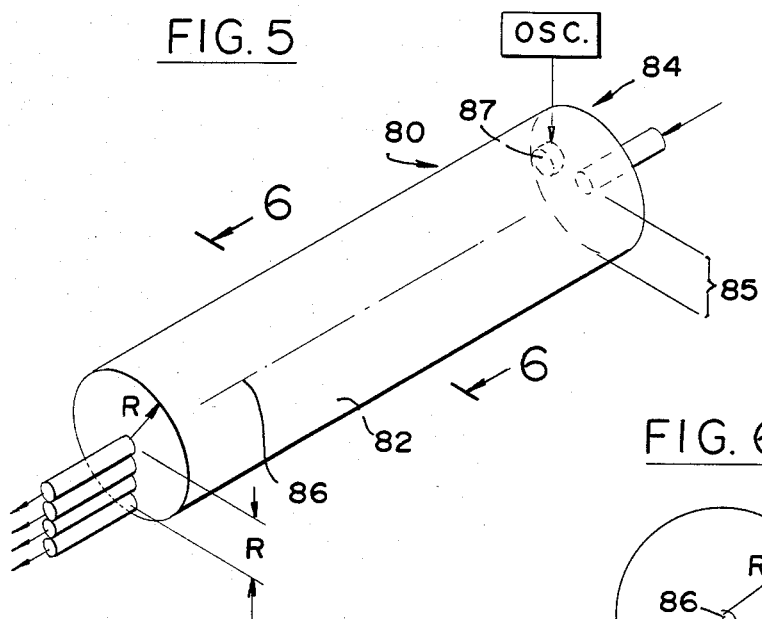
FIG. 5 is a simplified perspective view of an acoustic particle separator constructed in accordance with another embodiment of the invention.

FIGS. 1 and 2 illustrate a particle separation system 10 which includes walls 12 forming a chamber 14 of rectangular cross section and considerable length. An inlet 16 carries particles of different properties, such as particles of the same material but different sizes, and the chamber has a group of outlets 20, 22, and 24 that each pass particles within a limited size range. Particle separation is based on the use of acoustic energy, which is applied by a driver 26 that includes an oscillator 28 that drives a transducer 30 coupled to the top of the chamber at an end wall 32 thereof. The transducer 30 is driven at a frequency that produces sound of a wavelength equal to twice the height H of the cross section of the chamber. This is the lowest acoustic mode of a chamber of that height, and it produces a pressure node at a height H/2, where the pressure in the chamber is a minimum, and which corresponds to the center or minimum of a force potential well.

Particles of the same material but different sizes can be separated according to their size (or density or shape) by passing them slowly through the chamber from one end 32 to the other 34, while acoustic energy is applied that urges particles towards the center of the chamber height, and while another force such as the force of gravity is applied to the particles that urges them downwardly toward the bottom 36 of the chamber. As indicated in FIG. 2, minimum acoustic pressure exists along a line 36'. The force on a particle moving it towards the centerline 36', increases at positions progressively further from the center 36', until a maximum force exists at the position 38 which is one-fourth the height of the chamber above the bottom 36. Very small particles will lie at or slightly below the minimum force position 36', while much larger particles will be supported slightly above the maximum force location 38. Particles of an intermediate size will be distributed between the heights 36' and 38. Particles too heavy to be supported at the maximum acoustic force location 38, will fall therethrough, and lie at the bottom of the chamber 36.

FIG. 3 includes a curve 40 that represents the acoustic force potential U in the chamber of FIG. 2, for the lowest resonant mode, at different locations along the height H of the chamber. The negative derivative (slope) of the curve 40 is the force F on a particle at any position along the chamber height, and is represented by the force curve 42. The force on a particle at a height between 0 and 0.5 H, is in a direction towards the middle (the 0.5 H position) of the chamber, with the greatest force experienced at the height of 0.25 H. The force potential curve 40 may (in the absence of gravity) be thought of as a curved surface on which a ball can roll. A ball placed anywhere in the chamber will roll towards the center of the curve at the point 46, and will eventually settle at the center. The entire chamber area may be considered a force potential well, wherein objects placed anywhere within the well are urged towards the center of the well at 46. However, in the presence of another force such as that of gravity, particles too heavy to be supported at the location 47 (at 0.25 H) on the force curve, where the acoustic force is a maximum, will drop to the bottom of the chamber. The region 48 in FIG. 2 within which particles can be supported in the presence of gravity, or any other force that acts along a single direction, may be considered the levitation region for the lowest acoustic mode, with the point 47 representing one end of the levitation region and point 46 representing the other end of the region.

In FIGS. 1 and 2, the particles moving along the length of the chamber separate within the levitation region 48 according to size, and will exit through different outlets 20-24 of the chamber. The smallest particles 50 exit through the uppermost outlet 20, the largest particles 52 which can be supported by the acoustic force field exit through the lowermost outlet 24, and intermediate size particles 54 exit through the intermediate outlet 22. Large particles 56 that drop out of the force potential well 48, can be removed from the bottom of the chamber.

Instead of separating particles on the basis of size, particles can be separated according to other properties. For example, particles that have been screened to a certain size (they pass through one size screen, but not through a slightly smaller screen) but which are of different materials, can be separated according to the different densities of the particles. The same effect occurs as indicated in FIG. 2, but with the least dense particles occupying the highest position 36', the densest particles that can be supported occupying the position 38, and intermediately dense particles dropping to position 54. Very dense particles drop out to the bottom of the chamber 36. In a similar manner, particles that are all of the same material and that are all of the same size, can be separated according to their general configuration. That is, those particles that are most closely spherical, will lie furthest from the center of the chamber, while progressively more non-spherical particles will move progressively closer to the center of the well. As will be described below, the separation can be made very sensitive, and may be applied to applications such as the selection of hollow spheres to be used as targets in inertial fusion reactors, by separating hollow spheres according to the degree to which they approach a perfect sphere.

The determination of the largest particles that will remain within the force potential well 47 is made by selecting the acoustic pressure that is applied to the chamber. In one example, particles that are all of the same material are to be separated according to size, and the particles entering the chamber are of a size of 1 to 100 mils (one mil equals one thousandth of an inch) average diameter. In the presence of gravity and at a very high acoustic pressure all particles are supported in the levitation region, and at a certain lower acoustic intensity only particles below 75 mils diameter are supported within the well. Particles above 75 mils diameter will fall to the bottom of the chamber. In that case, the very small particles such as from one to 25 mils diameter may all be concentrated very close to the center of the pressure well at 36', while those particles progressively greater in size than 25 mils are spread apart by progressively greater amounts, up to the limit of 75 mils (larger particles drop out of the well).

In the above example, it may be desired to select primarily particles in the range of 70 to 75 mils diameter, out of the entire range of particle sizes. The acoustic intensity may be set so the heaviest particles supported, are of 75 mils diameter. This provides the greatest separation in height, between particles in the selected range (70-75 mils) and those lying outside the range (below 70 mils or above 75 mils). The particles of the selected range will then exit through the lowermost outlet 24.

In another method for selecting out only particles within the 70-75 mil diameter range, the acoustic intensity can be set to support only particles below a 75 mil diameter, so larger particles drop to the chamber periphery which is at the bottom of the chamber 36, and such particles are removed through the opening 60 (FIG. 1). The acoustic pressure is then reduced so that only particles below a 70 mil size will be supported within the levitation region 48. The only heavier remaining particles, in the 70 to 75 mils range, will drop to the bottom of the chamber from whence they can be removed. Thus, by controlling the intensity of the acoustic pressure, and/or varying it, relatively precise selection of particles can be made. It would be possible to provide a conveyor belt forming the bottom wall at 36, and to progressively lower the acoustic intensity so that particles are distributed on the belt according to their sizes. The same arrangement could be utilized along the bottom of the cylinder of FIG. 5 or sphere of FIG. 8.

The intensity of the acoustic energy within the chamber depends upon the "Q" of a chamber mode, as well as the position and output of the transducer such as 30 connected to the chamber. The Q is a measure of the ratio between the frequency of a resonant sound applied to the chamber and the bandwidth within which the sound intensity is 3 dB of the intensity attained at the center frequency of the bandwidth. A Q of about 100 is typically attainable for resonant modes of a rectangular chamber (or across any other chamber with flat parallel walls). An intensity of up to about 160 to 170 dB can be obtained with acoustic drivers that include an oscillator that drives a transducer, while even higher intensities can be obtained with sirens although they are more difficult to control. In any case, the 3 dB bandwidth of the excited mode applied is always less than 10% of the resonant or center frequency, and usually less than 1% (harmonics are not considered here). It may be noted that the transducer 30 is coupled to the chamber through a hole in an end wall 32, even though it is a vertical mode (of wavelength 2H) which is being excited. Such coupling is utilized to avoid placing holes in the top or bottom walls of the chamber, which would reduce the Q for acoustic energy moving along the height of the chamber.

In order to obtain a high acoustic intensity, the applied acoustic energy has a narrow bandwidth that is typically less than one-hundredth its frequency. Of course, such a signal is an almost pure sinusoidal signal. As shown in FIG. 4, the lowest resonant mode of the chamber height produces a wavelength indicated at 70, which is twice the height H of the chamber. This (and gravity) produces the levitation region 48 whose useful height, from H/2 to H/4, is ¼th the height of the chamber. It is possible to apply other resonant modes, with the second lowest mode being one having a wavelength, indicated at 72, equal to the height H of the chamber. This produces two force potential wells, with centers or minima at 74 and 76, respectively. It is possible to apply two or more modes simultaneously, to extend or shift the height or range of the levitation region of the combined modes.

Besides applying vertical acoustic forces, it can be useful to also apply horizontal positioning acoustic forces, as to concentrate particles along a center plane 78. Instead of withdrawing particles at the end of the chamber, it is possible to apply the end of a small diameter tube to the chamber, and withdraw particles from a particular height.

Figure 9:
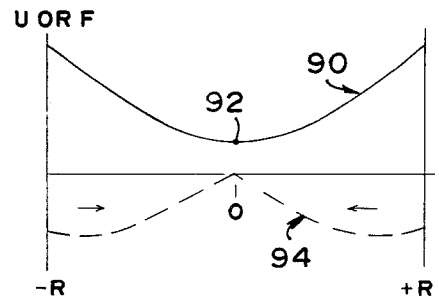
FIG. 9 is a graph showing variations of force potential with height, and variation of force with height, for the chambers of FIGS. 6 and 8 during operation at the lowest mode of each chamber.

Although a chamber of rectangular cross section is the easiest to analyze, advantages can be obtained by utilizing chambers of other configurations. FIG. 5 illustrates a system 80 which utilizes a chamber 82 of cylindrical form, with its axis 86 horizontal so it extends perpendicular to the force of gravity. The lowest resonant acoustic mode is obtained by operating the acoustic driver 84 to generate sound waves of a wavelength equal to 3.41 R, where R is the radius of the cross section of the cylinder. With the acoustic transducer 87 coupled to a chamber location which lies on a horizontal plane that passes through the axis 86, the standing wave pattern has a levitation region 85 in the presence of gravity, that extends from the bottom to the center 86 of the cylinder, along its entire length. The center or minimum of the force potential well lies along the axis 86 of the cylinder. FIG. 9 includes a curve 90 representing variation in force potential U in the cylinder with position, along the vertical direction. Along any other direction angled from the vertical, such as in the horizontal direction, a similar force potential curve is obtained with a potential minimum at the center. If we again assume the analogy of a ball rolling down a curved surface, it can be seen that a particle placed anywhere within the cylinder will, in the absence of any counterveiling force such as that of gravity, move to the center of the well at 92.

Figure 6:
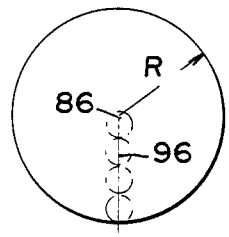
FIG. 6 is a view taken on the line 6—6 of FIG. 5, showing the positions of particles within the chamber thereof.
Figure 7:
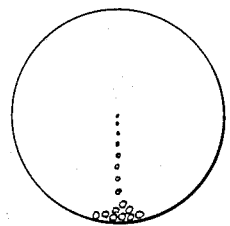
FIG. 7 is a view of the chamber of FIG. 6, shown during sensitive separation of particles in accordance with the invention.

The curve 94 represents variation in force F with position along the vertical, and is the negative derivative of the potential curve 90. The curve 94 shows that between the center of the cylinder at 0 and the bottom of the cylinder at $-R$, the force progressively increases (except near $+R$ or $-R$.) The arrows indicate the direction of the acoustic force. Accordingly, a group of spherical or other identically-shaped particles of the same material but different sizes, will be distributed along a vertical line extending down from the axis 86 of the cylinder. Thus, a larger distance is provided over which the particles will separate for a cylinder than for a chamber of rectangular cross-section, where their heights H and 2R are equal. In the case of the cylinder of FIG. 5, when in the presence of gravity, suspended particles will gravitate towards the vertical line 96 shown in FIG. 6.

The curves of FIG. 9 apply only where the driver 84 is coupled to a location on the cylinder near either side, as opposed to the top or bottom of the cylinder. If the driver is coupled to the top or bottom of the cylinder, greater upward force is applied to a particle in the resulting force potential well, but particles will be distributed only between the center and a location at a height of R/2 above the bottom of the cylinder.

Figure 8:
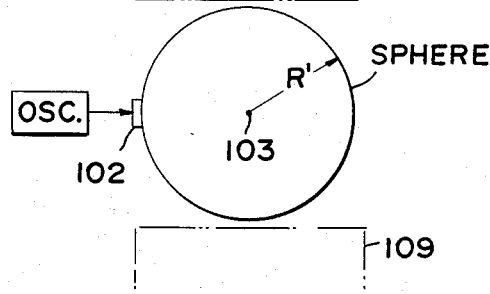
FIG. 8 is a sectional view of a spherical chamber showing another embodiment of the invention.
Figure 10:
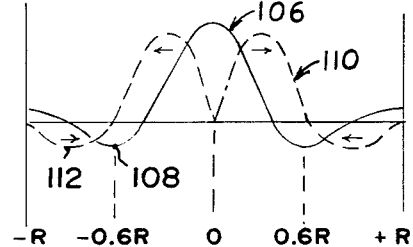
FIG. 10 is a graph showing variations of force potential with height, and variation of force with height, for the chambers of FIGS. 6 and 8 when operated in the lowest pure radial mode of each chamber.

An effect similar to that obtained where the chamber is a cylinder, can be obtained for a system which uses a spherical chamber, such as is shown at 100 in FIG. 8. In that case, the lowest spherical mode is obtained by driving the transducer 102 so it produces a wavelength equal to 3.02 R' where R' is the radius of the sphere. The transducer 102 lies on a horizontal plane that passes through the center 103 of the sphere. Such a system can be useful where a constant flow-through of particles is not required. For both the spherical and cylindrical chambers, a higher Q can be obtained by applying a pure radial mode to the chamber. In the case of the cylinder, the lowest pure radial mode has a wavelength of 1.64 R, and in the case of a sphere has a wavelength of 1.40 R'. In either case, a Q much greater than 100 (under ideal conditions a Q of up to about 1000 can be attained) to support heavier particles for given transducer output. However, the resulting pure radial mode standing wave pattern has a force potential well as shown at 106 in FIG. 10, and a resulting levitation region, that extends over a smaller portion of the diameter of the cylinder or sphere. The particles will be urged toward a position at 108 which is about 0.6 R from the center of the well. As can be seen from the curve 110 that shows force vs. distance from the center of the cylinder or sphere, the levitation region (in the presence of gravity) extends from point 112 at about $-0.75$ R to the point 108 at about $-0.6$ R where the force is zero.

While gravity is the most commonly available force field, electrostatic and magnetic fields can be established to counter the acoustic force to separate particles, as by the magnetic pole pieces 109 shown in FIG. 8. The nonacoustic forces are usually substantially linear, in that they apply a predetermined force in a predetermined direction, at any location within the chamber volume. It is possible to use two external force fields in different directions, to separate particles vertically according to one property, and horizontally according to another property. For example, gravity in the vertical direction can separate particles of different density, while an electrostatic field applied in the horizontal direction can separate particles of the same density but different charge. The electrostatic and magnetic forces are especially useful in outer space where large gravity forces are not applied. Of course, even in outer space simulated appreciable gravity forces can be obtained, as on a centrifuge or by otherwise accelerating a chamber.

Whether the force countering the acoustic force is due to gravity, electrostatic, magnetic or other fields, the separation of the particles is based on the fact that the acoustic force on a particle will be balanced by a non-acoustic force (e.g. gravity, electrostatic, or magnetic) at a position within the chamber that depends upon selected properties of the particles. The acoustic force applied to a particle depends on its shape and size. While the gravitational force on spherical particles of the same material increases proportionately with increase in the volume of the particle, the acoustic force increases slightly less than proportionately with volume. This results in separation of such particles by the acoustic field. The force due to nonacoustic fields such as gravity, electrostatics, and magnetism depend respectively on the mass, charge and magnetic attraction of the particle. The electrostatic charge or magnetic properties of particles determine the forces in electrostatic or magnetic fields, but have no effect on the forces applied by the acoustic field, to thereby enable separation of particles by their electric or magnetic properties. It should be understood that chambers have many modes, and particles can be separated within any of the wells resulting from a given mode. The technique can be applied to chambers of other geometrics than those described earlier.

Thus, the invention provides a method for separating particles by applying acoustic energy of a narrow frequency, or closely sinusoidal waveform, to a chamber, with the acoustic energy being of a wavelength which is resonant to a chamber mode, to establish an acoustic standing wave pattern in the chamber. The sinusoidal waveform like all sinusoidal waveforms has positive and negative amplitudes that are symmetrical about a zero level, with time. A group of particles are positioned in the chamber within the force potential well of the standing wave pattern, while a non-acoustic force field, such as of gravity, electrostatic, or magnetic nature, is applied. The acoustic energy urges particles towards the center of the force potential well, while the non-acoustic force field urges particles away from the center of the well. The distance of each particle from the center of the well can indicate a property of that particle, such as its average diameter, density, electrostatic charge, or magnetic properties. The particles are separately removed from different portions of the net force potential well, so that particles are separated according to the positions they assumed in the well. Such removal can be accomplished by just removing all particles within a narrow area of the well, or by dropping the particles out of the well by using a low enough aooustic energy intensity or by increasing the nonacoustic field intensity. The above separation techniques are believed to be especially useful in outer space applications where gravity is not present, in conjunction with other new techniques. The above techniques can be applied to other acoustic levitation systems such as an acoustic focusing radiator with a partially open chamber, as described in U.S. patent application, Ser. No. 272,837 filed June 12, 1981 by Lee et al.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for separating particles comprising:
applying sinusoidal acoustic energy to a chamber, which is resonant to a chamber mode, to establish an acoustic standing wave pattern that forms a force potential well in the chamber;
positioning a plurality of particles in said chamber within said well, while a nonacoustic force field is also applied to said chamber to urge particles away from the center of said well; and
removing particles from selected positions in said force potential well, so that some particles are removed from other particles according to the positions they assumed in said well;
said particles include particles of a wide range of sizes including particles of a desired size range and particles larger than said desired range, and said step of applying includes applying acoustic energy of a level which is weak enough to allow particles larger than said desired size range to drop out of said well.

2. A method for separating particles comprising:
applying sinusoidal acoustic energy to a chamber, which is resonant to a chamber mode, to establish an acoustic standing wave pattern that forms a force potential well in the chamber;
positioning a plurality of particles in said chamber within said well, while a nonacoustic force field is also applied to said chamber to urge particles away from the center of said well; and
removing particles from selected positions in said force potential well, so that some particles are removed from other particles according to the positions they assumed in said well;
said chamber is cylindrical and is oriented with the axis of the cylinder extending perpendicular to the direction of said nonacoustic force; and
said step of applying acoustic energy includes applying acoustic waves of the lowest cylindrical mode, of a wavelength of 3.41 times the radius of the cylinder.

3. A method for separating particles comprising:
applying sinusoidal acoustic energy to a chamber, which is resonant to a chamber mode, to establish an acoustic standing wave pattern that forms a force potential well in the chamber;
positioning a plurality of particles in said chamber within said well, while a nonacoustic force field is also applied to said chamber to urge particles away from the center of said well; and
removing particles from selected positions in said force potential well, so that some particles are removed from other particles according to the positions they assumed in said well;
said chamber is a sphere;
said step of applying acoustic energy includes applying acoustic waves of the lowest spherical mode, of a wavelength of 3.02 times the radius of the sphere.

4. The method described in claim 3 wherein:
said step of applying acoustic energy includes driving a transducer coupled to a location at the wall of said chamber, wherein the transducer is located on an imaginary plane which is perpendicular to the nonacoustic force field and which passes through the center of the sphere.

5. A method for separating particles comprising:
applying sinusoidal acoustic energy to a chamber, of a frequency which is resonant to the chamber, to establish a standing wave pattern with a location of minimum acoustic force, while a nonacoustic substantially linear second force is applied to said chamber to urge particles in a direction away from said location, to form a levitation region within which particles can be suspended against said second force;
establishing said group of particles in said levitation region; and
withdrawing particles from a selected location in said levitation region;
said step of applying acoustic energy includes applying energy of a first intensity, and then reducing the intensity relative to said second force to allow only some of the particles to fall out of said levitation region toward the periphery of the chamber.

* * * * *